March 18, 1969 T. C. JEDNACZ ETAL 3,434,032
RECTIFIER SYSTEM WITH INTEGRAL CYCLE CONTROL
Filed June 20, 1967
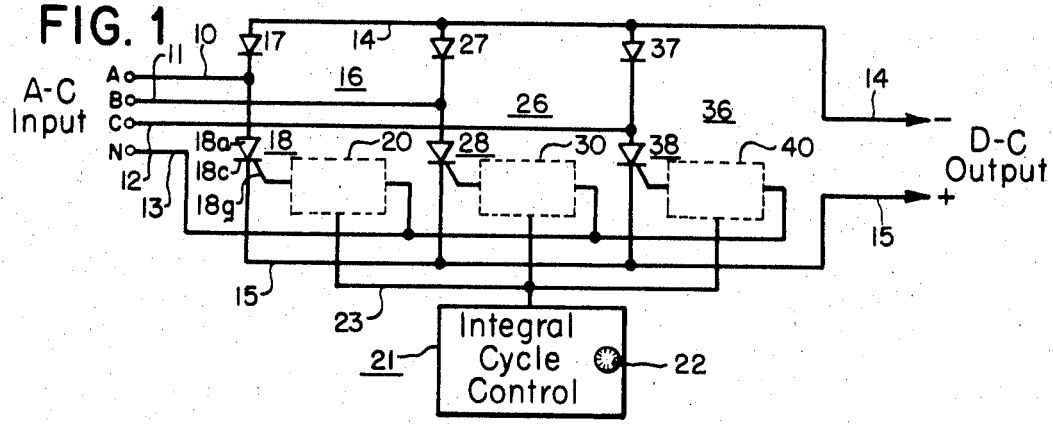
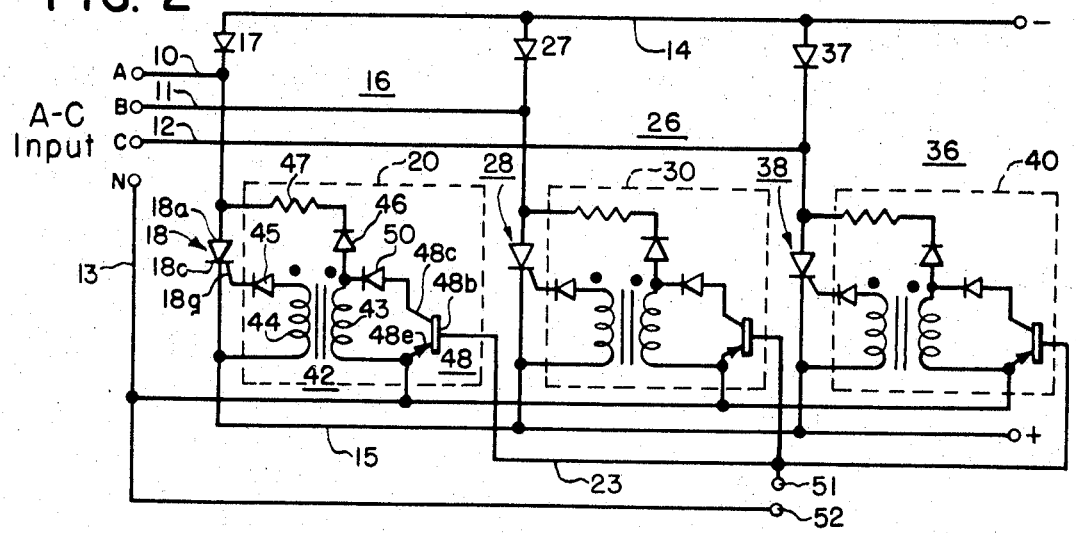
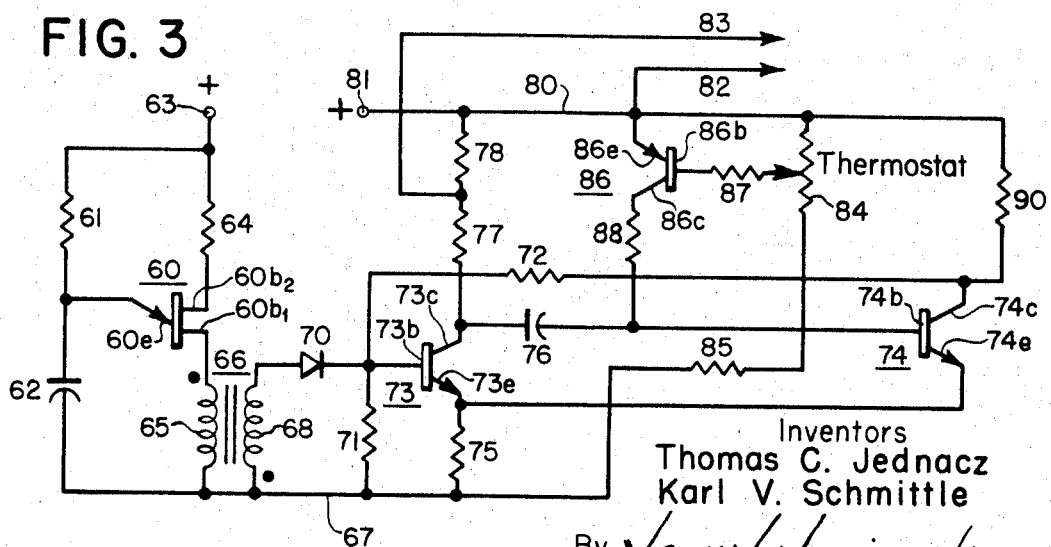
Inventors
Thomas C. Jednacz
Karl V. Schmittle
By James J. Jennings, Jr.
Attorney

United States Patent Office 3,434,032
Patented Mar. 18, 1969

3,434,032
RECTIFIER SYSTEM WITH INTEGRAL CYCLE CONTROL
Thomas C. Jednacz and Karl V. Schmittle, York, Pa., assignors to Borg-Warner Corporation, Chicago, Ill., a corporation of Illinois
Filed June 20, 1967, Ser. No. 647,472
U.S. Cl. 321—5                      5 Claims
Int. Cl. H02m 7/20, 1/08

ABSTRACT OF THE DISCLOSURE

A three phase rectifier arrangement includes, in each phase, a diode with an SCR which has its gate coupled over a transformer to the A-C input circuit. When the varying A-C input is of the wrong polarity to make the SCR conduct it is of the proper polarity to cause current flow across the transformer to the SCR gate. As soon as the input A-C polarity across the SCR changes, the SCR immediately conducts because current is already flowing in the gate circuit. A transistor is coupled in parallel with the transformer primary winding and, when gated on, effectively shunts the primary and prevents current injection into the SCR gate, thus preventing conduction of the SCR during a particular cycle or cycles. A suitable pulse generator applies cycle control signals to all the transistor switches.

Background of the invention

The present invention is directed to a rectifier system for converting A-C energy into D-C energy and more particularly to such a system in which the conduction of the electronic switching components is regulated over a complete cycle, or an integral number of cycles of the A-C input signal, as opposed to "phase angle control" or other systems which regulate energy transfer to the load by regulating conduction of the electronic switching components for a fraction of one cycle of the A-C input signal.

Many inverter systems have been fabricated with phase angle control in which the load requirements or the level of the D-C output signal is sensed, or some other approach is utilized to provide a control signal regulating that portion of the input A-C cycle over which the system will be effective to produce D-C output energy. Disadvantages of such systems include the complex and expensive logic circuitry necessarily entailed in a phase angle control arrangement and the production of undesirable radio-frequency interference (RFI) as the SCR's are rapidly switched during only a fraction of an input cycle time. Moreover, the efficiency generally drops off at partial load with a phase angle control system and the ripple factor becomes higher, necessitating the use of a D-C choke which occupies considerable valuable space and is also costly. These manifest disadvantages of the complex phase angle control system have encouraged considerable research activity to find another and better solution of the power conversion arrangement, but it has remained for this invention to provide a simplified system which overcomes these disadvantages.

Summary of the invention

The present invention is a rectifier for translating three phase A-C energy received over a plurality of input conductors into D-C energy for transfer over a pair of output conductors to a load. In a preferred embodiment the rectifier circuit includes, in each phase circuit, a unidirectional current conduction means coupled between a first one of the input conductors and a first one of the output conductors. A semi-conductor switch, such as an SCR, has its anode and cathode elements coupled between the first input conductor and the second one of the output conductors in a sense to pass current in the same direction (with respect to the output conductors) as does the unidirectional current conduction means. The semiconductor switch also has a control element.

Important to the inventive combination is an auxiliary current conduction circuit, coupled between the first and second input conductors and also coupled to the control element of the semiconductor switch. This auxiliary circuit passes current to the control element of the semiconductor switch when a potential difference of one polarity is applied between the first and second input conductors, such that as soon as the opposite polarity potential difference appears between the same input conductors the semiconductor switch is turned on. The auxiliary current conduction circuit also includes switching means operable to preclude significant current flow to the control element of the semiconductor switch and thus prevent conduction of the semiconductor switch even when a potential difference of appropriate polarity is applied between the input conductors. Also included is means for applying a control signal to the switching means in the auxiliary current conduction circuit to regulate conduction and non-conduction of the semiconductor switch. Because it is a three phase circuit, there is an additional unidirectional current conduction means, semiconductor switch, and an auxiliary current conduction circuit for each of the additional phase circuits.

The drawings

In the several figures of the drawing like reference numerals identify like elements and in the drawing:
FIGURE 1 is a block and schematic diagram illustrating the general system arrangement;
FIGURE 2 is a schematic diagram depicting circuit details of a preferred embodiment of the invention; and
FIGURE 3 is a schematic diagram disclosing circuit details of an integral cycle control circuit suitable for use with the rectifier circuit of FIGURE 2.

General description of the invention

FIGURE 1 depicts the inventive rectifier arrangement for receiving A-C input energy over conductors 10–13 (frequently designated A, B, C and N) and transferring D-C output energy over conductors 14, 15. First phase circuit 16 includes a unidirectional current conduction means or diode 17 coupled between first input conductor 10 and first output conductor 14, and a semiconductor switch 18 having anode and cathode elements 18a and 18c coupled between first input conductor 10 and second output conductor 15 in a sense to pass current in the same direction, with respect to the output conductors 14 and 15, as does diode 17. Semiconductor switch or SCR 18 also includes a gate or control element 18g.

In accordance with the inventive teaching an auxiliary current conduction circuit 20 is provided. As will be seen subsequently this auxiliary circuit 20 can pass current to the control element 18g when a potential difference of one polarity is applied between input conductors 10, 13, which polarity is not the appropriate one to effect current flow through SCR 18. Accordingly as soon as the polarity of the voltage between conductors 10 and 13 reverses, because the current flow to gate 18g does not cease instantaneously, SCR 18 is triggered on and conducts current from input conductor 10 through the SCR, over second output conductor 15 and the load (not shown) connected to the output conductors, first output conductor 14 and one of the diodes 27, 37 and its associated input conductor 11 or 12 to the A-C input circuit. Thus absent any regulation by integral cycle control unit 21, shown coupled to each of the auxiliary current conduction circuits 20, 30 and 40, each of the semiconductor switches 18, 28 and 38 will be gated on when current is injected into its gate and then the appropriate polarity potential difference is applied between is anode and cathode, and a D-C output voltage will be passed over output conductors 14, 15 to any suitable load. Adjustment of regulating means or knob 22 in unit 21 will, in a manner to be described hereinafter in connection with FIGURE 2, in effect interrupt the gate circuits of the SCR's and thus prevent their conduction during one complete cycle, or a plurality of cycles, of the alternation of the A-C input signals.

*Detailed description of the invention*

Considering now the more detailed showing of FIGURE 2, diode 17 and SCR 18 are coupled in series as already explained. Auxiliary current conduction circuit 20 comprises a transformer 42 having a primary winding 43 and a secondary winding 44, the upper end of secondary winding 44 being coupled through a diode 45 to control element 18g of semiconductor switch 18. The other end of secondary winding 44 is coupled to cathode 18c and to second D-C output conductor 15.

One end of primary winding 43 is coupled directly to second input conductor 13 and the other end of primary winding 43 is coupled through a series circuit, including a diode 46 and a resistor 47, to the first input conductor 10. Thus it is evident that auxiliary circuit 20 is coupled between first and second input conductors 10, 13 and also coupled to gate or control element 18g of semiconductor switch 18.

Auxiliary current conducting circuit 20 also includes a switching means or transistor 48 having emitter, base, and collector elements referenced by *e*, *b* and *c* respectively. Emitter 48e is coupled to one end of primary winding 43 and to second input conductor 13, and collector 48c is coupled through a diode 50 to the common connection between diode 46 and the other end of primary winding 43. Base 48b is coupled over a conductor 23 to one terminal 51 of terminal pair 51, 52, between which a suitable integral cycle control signal can be applied. The second and third phase circuits 26 and 36 comprise similar components and similarly connected auxiliary current conducting circuits 30 and 40, the interconnection and operation of which will be readily apparent from the explanation of first phase circuit 16 including auxiliary circuit 20.

When energized a three phase A-C potential is applied between the conductors 10, 11, 12 and 13 of the rectifier system. Assuming initially that switching means 48 in circuit 20 is non-conductive and that the potential on first input conductor 10 is negative with respect to that on second input conductor 13, current flows from conductor 13 over primary winding 43, diode 46, and resistor 47 to first input conductor 10. The windings of transformer 42, as indicated by the polarity dots, provided a potential difference across secondary winding 44 which causes current to flow through diode 45 into gate 18g of semiconductor switch 18. However with the potential on its anode negative with respect to its cathode at this time, the semiconductor switch is not rendered conductive.

As soon as the polarity of the potential applied between conductors 10, 13 reverses, the appropriate energizing polarity is provided across anode 18a and cathode 18c of SCR 18, and current, is still being injected into its gate 18g by reason of the inductance in the transformer circuit. Accordingly SCR 18 is "fired" precisely at the time when the applied A-C voltage crosses the zero axis and goes positive. The SCR is commutated or turned off when the applied voltage goes negative. Inspection of the second and third phase circuits 26, 36 shows exactly similar operation occurs in those circuits.

It is noted that, once SCR 18 has been prepared for operation by injection of gate current over transformer 42 and diode 45, and then fired as a voltage of the proper polarity appears between conductors 10 and 13, SCR 18 cannot be turned off during the remainder of that cycle as its anode remains positive relative to its cathode. When it is desired to prevent conduction of SCR 18 during the input A-C cycle when its anode is positive with respect to its cathode, a suitable signal is applied over conductor 23 to render switching means 48 closed or conductive. As transistor 48 conducts it effectively short circuits primary winding 43 and thus there is no significant current flow across transformer 42 to inject current into the gate 18g of SCR 18. With no gate current flowing during the half cycle when anode 18a is negative with respect to cathode 18c, after the polarity reverses semiconductor switch 18 will not be gated on because there is no turn-on signal at its gate. It is noted that even if transistor 48 becomes non-conductive during this latter portion of the input cycle (when anode 18a is positive relative to cathode 18c), the SCR 18 will still not be switched on because the applied potential difference is not of the proper polarity to effect current flow from the input circuit 10, 13 across transformer 42 to gate 18g. Thus a true integral cycle switching arrangement is provided for the rectifier system because the SCR's cannot be turned on or off at the wrong time. That is, the semiconductor switches can never conduct over a frictional portion of the A-C input cycle but they either conduct over an entire cycle by reason of the current injection already provided during the negative half cycle or else remain non-conductive throughout the cycle if there is no current passed to the gate to condition the SCR for conduction. Exactly similar operation of the auxiliary current conduction circuits 30, 40 in the other phase circuits 26, 36 occurs as the system is energized.

*Integral cycle control circuit*

FIGURE 3 illustrates one suitable arrangement for applying switching signals to the transistors or switching means in each of the auxiliary current conducting circuits. Those skilled in the art will appreciate that this illustration and description is by way of example only and other suitable pulse-generating and applying circuits can be substituted for that depicted in FIGURE 3.

In the left-hand portion of FIGURE 3 unijunction transistor 60 includes an emitter 60e, a first base connection $60b_1$ and second base connection $60b_2$. Emitter 60e is connected to the common connection between a resistor 61 and a capacitor 62. The other end of resistor 61 is coupled to a first positive input terminal 63, and this terminal is also coupled through another resistor 64 to base $60b_2$. The other base $60b_1$ is coupled through primary winding 65 of transformer 66 to reference conductor 67.

Transformer 66 has a secondary winding 68, one end of which is coupled to conductor 67 and the other end of which is coupled over a diode 70 to the common connection between resistor 71, resistor 72, and base $73b$ of transistor 73. The other side of resistor 71 is connected to conductor 67. Emitter 73e is coupled to emitter 74e of another transistor 74, and both emitters are coupled through resistor 75 to conductor 67.

Collector 73c is coupled through a capacitor 76 to base 74b, and collector 73c is also coupled through the series circuit including resistors 77, 78 to conductor 80, itself connected to another positive energizing terminal 81. The output conductors 82, 83 are coupled to conductor 80 and to the junction between resistors 77 and 78.

A potentiometer 84 is coupled between conductor 80 and a resistor 85, the other side of which is connected to conductor 67. Although shown as a potentiometer element 84 may in fact be a thermostat or other element which exhibits a change in its effective resistance as a function of ambient temperature. A transistor 86 has its base 86b coupled through a resistor 87 to the movable tap of thermostat 84 and its collector 86c is coupled through another resistor 88 to the common connection between capacitor 76 and base 74b of transistor 74. A resistor 90 is coupled between conductor 80 and the common connection between resistor 72 and collector 74c.

Basically the circuit of FIGURE 3 is a pulse width modulated one shot multivibrator. The operation of the unijunction timing circuit including transistor 60 is well known and the circuit produces a positive-going "spike" or sharply defined trigger pulse which is coupled over transformer 66 and diode 70 to base 73b, thus providing a negative-going output pulse at collector 73c. The output pulse is developed across resistor 78 and applied over output conductor 83. Conductors 82, 83 would normally be connected to terminals 52, 51 in FIGURE 2 so that the negative-going pulse on conductor 83 would be simultaneously applied to the base of each of the switching means in each of the auxiliary current conducting circuits 20, 30 and 40. In a preferred embodiment the pulse width appearing on conductor 83 was made to vary from approximately 0.25 second to 2.5 seconds. The high scale value of 2.5 seconds provides a constant negative voltage because the pulse width is then equal to the repetition rate for the circuit values given as an illustration at the end of the specification.

Transistor 74 is normally saturated by reason of the potential applied from conductor 80 through transistor 86 and resistor 88 to base 74b, so that the potential at collector 74c is approximately one volt. When the positive-going trigger pulse is applied to base 73b, transistor 73 is rapidly driven into saturation and the voltage at collector 73c goes negative, toward ground potential, coupling a negative-going pulse through capacitor 76 to base 74b and cutting off transistor 74. Accordingly the voltage at collector 74c rapidly goes positive and this voltage is applied back through resistor 72 to base 73b, holding transistor 73 in the saturated condition until capacitor 76 charges sufficiently so that the potential at base 74b is sufficiently positive to again drive transistor 74 into saturation. As it does collector 74c rapidly goes negative and this negative-going pulse is applied over resistor 72 to base 73b to cut off transistor 73 (and return the circuit to its initial or normal state). Current flow through transistor 74 and resistor 75 develops a voltage drop across resistor 75 of the proper polarity to keep transistor 73 turned off.

The time duration or width of the negative output pulse between conductors 83, 82 is determined by transistor 86. In effect this transistor is used as a variable resistance, with its collector circuit impedance varying as a function of the bias voltage applied to base 86b which in turn is determined by the setting of potentiometer or thermostat 84. With a standard 135 ohm thermostat, as the effective value of thermostat 84 is varied from zero to 135 ohms the conduction level of transistor 86 is driven from cut off to saturation. At cut off the effective resistance of transistor 86 is very high, several hundred thousand ohms. At saturation the effective resistance of this transistor is approximately 750 ohms, and this value determines the minimum pulse width produced by the system.

To assist those skilled in the art to make and use the invention a table of circuit values utilized in a preferred embodiment is set out below. It is emphasized that this table of values is given by way of illustration only and in no sense as a limitation of the invention.

| Component: | Identification of value |
|---|---|
| 18, 28, 38, 17, 27, 37 | GE C3513BF1AD1 |
| 48, 86 | 2N404A |
| 60 | 2N1671 |
| 73, 74 | 2N2925 |
| 45, 46, 50, 70 | 1N540 |
| 62 | microfarads__ 10.0 |
| 76 | do____ 10 |
| 47 | ohms__ 1K |
| 61 | do____ 247K |
| 64 | do____ 1K |
| 71 | do____ 47K |
| 72 | do____ 6.8K |
| 75 | do____ 50 |
| 77 | do____ 150 |
| 78 | do____ 1K |
| 84 | do____ 0–135 |
| 85 | do____ 2K |
| 87 | do____ 5.1K |
| 88 | do____ 750 |
| 90 | do____ 1K |

Terminal:
| | |
|---|---|
| 63 | volts__ +7.5 |
| 81 | do____ +10.0 |

The present invention provides simple and positive regulation of a three phase rectifier circuit and does so without the generation of radio frequency interference which generally is a concomitant of phase angle control. This is accomplished with the significantly simplified and less expensive logic arrangement in which a single gating signal is simultaneously applied to an auxiliary circuit in each phase circuit to determine whether the SCR's will be completely on or completely off for one cycle or an integral number of cycles of operation. Good efficiency is maintained at partial load without the necessity of a large D-C choke to minimize the effects of the ripple on the output conductors. A simple pulse generating circuit can be utilized to regulate the conduction and non-conduction of each phase circuit in the three phase rectifier system.

While a particular embodiment of the invention has been shown and described, it will be apparent to those skilled in the art that various changes and modifications may be made therein without departing from the invention in its broader aspects.

We claim:
1. A rectifier for translating A-C energy received over a pair of input conductors into D-C energy for transfer over a pair of output conductors to a load, comprising:
   unidirectional current conduction means coupled between a first one of said input conductors and a first one of said output conductors;
   a semiconductor switch, having anode and cathode elements coupled between said first input conductor and the second of said output conductors in a sense to pass current in the same direction, with respect to said output conductors, as said unidirectional current conduction means, said semiconductor switch also having a control element;
   an auxiliary current conduction circuit, coupled between said first and second input conductors and also coupled to said control element of the semiconductor switch, for passing current to said control element responsive to application of a potential difference of one polarity between said first and second input conductors, such that as soon as the opposite polarity potential difference appears between said first and second input conductors the semiconductor switch is turned on, and switching means in said auxiliary current conducting circuit operable in a given state to preclude significant current flow to said control element of the semiconductor switch and consequently prevent conduction of said semiconductor switch even when a potential difference of said one polarity is applied between said input conductors; and means for applying a control signal to said switching means in the auxiliary current conduction circuit to regulate conduction and non-conduction of said semiconductor switch.

2. A rectifier as claimed in claim 1 in which said auxiliary current conduction circuit includes a transformer having primary and secondary windings, said primary winding being coupled in parallel with said switching means and said secondary winding being coupled between said control element and said cathode element of the semiconductor switch, so that when said switching means is in an open circuit condition significant current flow passes from said first and second input conductors across said transformer to the control element of the semiconductor switch.

3. A rectifier as claimed in claim 2 and further comprising two additional input conductors to receive, with said first and second input conductors, three-phase A-C energy and two additional phase rectifier circuits, each additional phase rectifier circuit including a unidirectional current conduction means, a semiconductor switch, and an auxiliary current conduction circuit intercoupled in a manner analogous to the first rectifier circuit described in claim 2, and in which said control signal is applied to the switching means in each of the three auxiliary current conduction circuits to regulate all of said semiconductor switches.

4. A rectifier as claimed in claim 2 in which said semiconductor switch is a silicon controlled rectifier, said switching means is a transistor having base, emitter and collector elements, and in which a first diode is coupled between one end of said secondary winding and the control element of said semiconductor switch to permit current flow only in the proper direction to said control element, and a second diode is coupled between said first input conductor and one end of said primary winding in the proper sense to permit current flow through said primary winding only when a potential difference of said one polarity is applied between said first and second input conductors.

5. A rectifier system for translating three-phase A-C energy received over four input conductors into D-C energy for transfer over a pair of output conductors to a load, in which each phase circuit comprises:

a first diode coupled between the first of said input conductors and the first of said output conductors;

a first semiconductor switch, having anode and cathode elements coupled respectively to said first input conductor and said second output conductor, and having a gate element;

an auxiliary current conducting circuit including a transformer having primary and secondary windings, a second diode coupled between one end of said primary winding and said first input conductor, the other end of said primary winding being coupled to said second input conductor, a second semiconductor switch having an emitter element coupled to said second input conductor, a collector element coupled through a third diode to the common connection between said one end of the primary winding and said second diode, and a base element, said secondary winding having one end coupled to said cathode element of the first semiconductor switch and the other end coupled through a fourth diode to the gate element of said first semiconductor switch, such that non-conduction of said second semiconductor switch allows current flow through said primary winding of the transformer as a potential difference of one polarity is applied between said first and second input conductors and thus provide current flow through the secondary winding to the gate element of said first semiconductor switch to condition it for conduction, which conduction occurs responsive to a potential difference of a polarity opposite said one polarity applied between said first and second input conductors; and means, coupled in common to the base element of the second semiconductor switch in the auxiliary current conducting circuit of each phase circuit, for selectively applying a gating signal which renders said second semiconductor switches conductive and shunts said primary winding of each transformer to preclude current injection into the gate element of each associated first semiconductor switch and thus regulate the number of cycles the rectifier system remains non-conductive.

References Cited

UNITED STATES PATENTS

| | | | |
|---|---|---|---|
| 3,281,645 | 10/1966 | Spink | 321—47 |
| 3,335,291 | 8/1967 | Gutzwiller | 323—22 |
| 3,381,226 | 4/1968 | Jones et al. | 307—252 |

JOHN F. COUCH, *Primary Examiner.*

W. H. BEHA, JR., *Assistant Examiner.*

U.S. Cl. X.R.

321—16